United States Patent
Chen et al.

(10) Patent No.: US 7,288,216 B2
(45) Date of Patent: *Oct. 30, 2007

(54) METHOD OF MAKING ELECTROLUMINESCENT PHOSPHORS WITH SMALL PARTICLE SIZES AND POWDER WITH D50 VALUE OF NO MORE THAN 10 MICROMETERS

(75) Inventors: Xianzhong Chen, Sayre, PA (US); Shellie K. Northrop, Sayre, PA (US)

(73) Assignee: Osram Sylvania Inc., Danvers, MA (US)

( * ) Notice: Subject to any disclaimer, the term of this patent is extended or adjusted under 35 U.S.C. 154(b) by 275 days.

This patent is subject to a terminal disclaimer.

(21) Appl. No.: 10/907,358

(22) Filed: Mar. 30, 2005

(65) Prior Publication Data
US 2006/0220546 A1 Oct. 5, 2006

(51) Int. Cl.
C09K 11/56 (2006.01)
C09K 11/54 (2006.01)
(52) U.S. Cl. .................. 252/301.6 S; 313/503
(58) Field of Classification Search ......... 252/301.6 S; 313/503
See application file for complete search history.

(56) References Cited

U.S. PATENT DOCUMENTS

| | | | |
|---|---|---|---|
| 4,859,361 A | 8/1989 | Reilly et al. | 252/301.6 S |
| 5,009,808 A | 4/1991 | Reilly et al. | 252/301.6 S |
| 5,220,243 A | 6/1993 | Klinedinst et al. | 313/502 |
| 5,244,750 A | 9/1993 | Reilly et al. | 428/690 |
| 5,525,313 A | 6/1996 | Kawano et al. | |
| 5,643,496 A | 7/1997 | Brese et al. | 252/301.65 |
| 5,702,643 A | 12/1997 | Reddy et al. | 252/301.65 |
| 6,064,150 A | 5/2000 | Klinedinst et al. | 313/503 |
| 6,090,311 A | 7/2000 | Brese et al. | 252/301.65 |
| 6,248,261 B1 | 6/2001 | Takemura et al. | 252/301.6 S |
| 6,309,700 B1 | 10/2001 | Fan et al. | 427/213 |
| 6,702,958 B2* | 3/2004 | Takehara et al. | 313/504 |
| 7,067,071 B1* | 6/2006 | Kappe et al. | 252/301.6 S |
| 2002/0113226 A1 | 8/2002 | Takehara et al. | |
| 2006/0071587 A1 | 4/2006 | Yamaguchi et al. | |
| 2006/0230980 A1 | 10/2006 | Kappe et al. | |

FOREIGN PATENT DOCUMENTS

| | | |
|---|---|---|
| DE | 887 094 | 8/1953 |
| EP | 1 215 263 A2 | 6/2002 |
| EP | 1 367 113 A2 | 12/2003 |
| JP | 09-13029 * | 1/1997 |
| WO | WO 91/16722 | 10/1991 |
| WO | WO 01/34723 * | 5/2001 |
| WO | WO 01/34723 A1 | 5/2001 |
| WO | WO 2004/031322 A1 | 4/2004 |

OTHER PUBLICATIONS

U.S. Appl. No. 10/907,360, filed Mar. 30, 2005 to Belinski-Wolfe et al.

* cited by examiner

Primary Examiner—C. Melissa Koslow
(74) Attorney, Agent, or Firm—Robert F. Clark

(57) ABSTRACT

An electroluminescent phosphor powder includes copper-activated zinc sulfide particles that have a size distribution with a D50 value of no more than 10 μm, where no more than 25% of the particles have a size greater than about 15 μm and/or a 24-hr brightness of at least 15 footlamberts. These particles are made by a method that includes first firing copper-doped zinc sulfide mixed with zinc oxide, sulfur and a chloride-containing flux, rapidly cooling the mixture to below 100° C., and then mulling and second firing the mixture to provide a powder. The powder can then be elutriated to provide the electroluminescent powder with a narrow particle size distribution (more than 90% between about 5 and 15 μm). The elutriating step can be avoided (albeit with a slightly wider size distribution) by more tightly controlling the first firing temperature.

10 Claims, 2 Drawing Sheets

METHOD OF MAKING ELECTROLUMINESCENT PHOSPHORS WITH SMALL PARTICLE SIZES AND POWDER WITH D50 VALUE OF NO MORE THAN 10 MICROMETERS

BACKGROUND OF THE INVENTION

This invention relates to zinc sulfide-based electroluminescent phosphors which are used primarily in so-called thick-film electroluminescent (EL) lamps. More specifically, the invention relates to a method of making small particle size electroluminescent phosphors and to a powder containing small phosphor particles.

A cross-sectional illustration of a conventional thick-film EL lamp is shown in FIG. 1. The lamp 2 has two dielectric layers 20 and 22. A first conductive material 4, such as aluminum or graphite, coated on a plastic film 12b forms a first electrode of the lamp 2; while a thin layer of a transparent conductive material 6, such as indium tin oxide, coated on a second plastic film 12a forms a second electrode. Sandwiched between the two conductive electrodes 4 and 6 are two layers 20 and 22 of dielectric material 14 which can be, for example, cyanoethyl cellulose or cyanoethyl starch. Adjacent to the first electrode 4 is a layer of dielectric material 14 in which are embedded particles of a ferroelectric material 10, preferably barium titanate. Adjacent to the second electrode 6 is a layer of dielectric material 14 in which are embedded particles of an electroluminescent phosphor 8. The phosphors available for thick-film EL lamps are primarily comprised of zinc sulfide that has been doped with various activators, e.g., Cu, Au, Ag, Mn, Br, I, and Cl. Examples of these phosphors are described in U.S. Pat. Nos. 5,009,808, 5,702,643, 6,090,311, and 5,643,496. Typically, the individual particles of the EL phosphors are encapsulated with an inorganic coating in order improve their resistance to moisture-induced degradation. Examples of such coatings are described in U.S. Pat. Nos. 5,220,243, 5,244,750, 6,309,700, and 6,064,150.

Copper-activated zinc sulfide electroluminescent (EL) phosphors (ZnS:Cu) are well known. Such phosphors are typically co-activated with Cl and/or Mn. Examples of these phosphors and their methods of manufacture are described in U.S. Pat. Nos. 4,859,361, 5,702,643, and 6,248,261. Some of the applications using electroluminescent phosphors require that the phosphors have small particles sizes. For example, EL phosphor paints used for decorating purposes require small particle size EL phosphors in order to make a stable paint suspension. Manufacturers of EL lamps are also interested in small size EL phosphor powders because they can produce more homogeneous EL phosphor layers and also save material costs since less phosphor is needed for a similarly sized lamp.

U.S. Pat. No. 5,643,496 describes how to make EL phosphors with a particle size under 23 μm. U.S. Pat. No. 6,702,958 describes how to make EL phosphors with particle sizes between 10 and 20 μm, with added emphasis on particle size distribution. However, solid state synthesis methods of making small particle size EL phosphors have not been well established. To obtain a material with a particle size under 15 μm, for example, the previously disclosed methods may generate large, wasteful, coarse portions which are subsequently discarded because the as-synthesized particle sizes were normally over 20 μm.

SUMMARY OF THE INVENTION

Therefore, an object of the present invention to provide a novel powder of EL phosphor particles that have a size distribution with a D50 value of no more than 10 μm and where no more than 25% of the particles have a size greater than about 15 μm and/or where the particles have a brightness of at least 15 footlamberts. As used herein, the particle size is in reference to a cumulative volume fraction (%), in particular, the D50 value is the particle size at which the cumulative volume of particles reaches 50%.

Another object of the present invention is to provide a novel method of making EL phosphors particles that have a size distribution with a D50 value of no more than 10 μm.

A further object of the present invention is to provide a novel method of making EL phosphors particles in which the particles are elutriated after firing to provide a narrow size distribution (more than 90% of the particles have a size in the range of about 5 μm to about 15 μm with a D50 value of no more than 10 μm.

A yet further object of the present invention is to provide a novel method of making EL phosphors particles in which the first firing temperature is controlled in a narrow range of 1050-1085° C. so that the particles have a size distribution with a D50 value of no more than 10 μm.

These and other objects and advantages of the invention will be apparent to those of skill in the art of the present invention after consideration of the following figures and description of preferred embodiments.

DETAILED DESCRIPTION OF THE INVENTION

Figure 1:
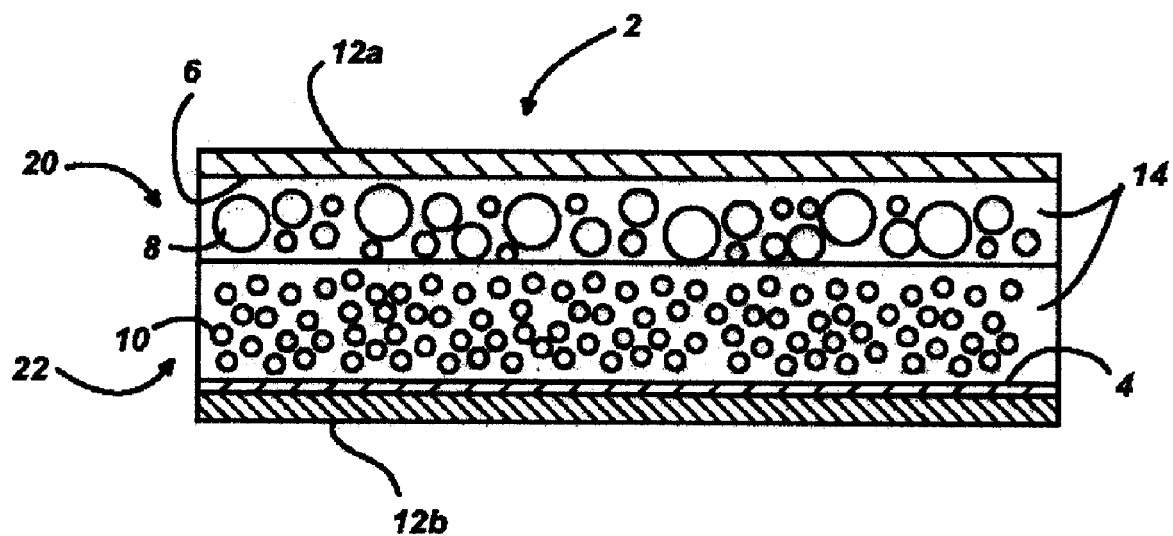
FIG. 1 is a cross-sectional illustration of a conventional thick-film EL lamp.
Figure 2:
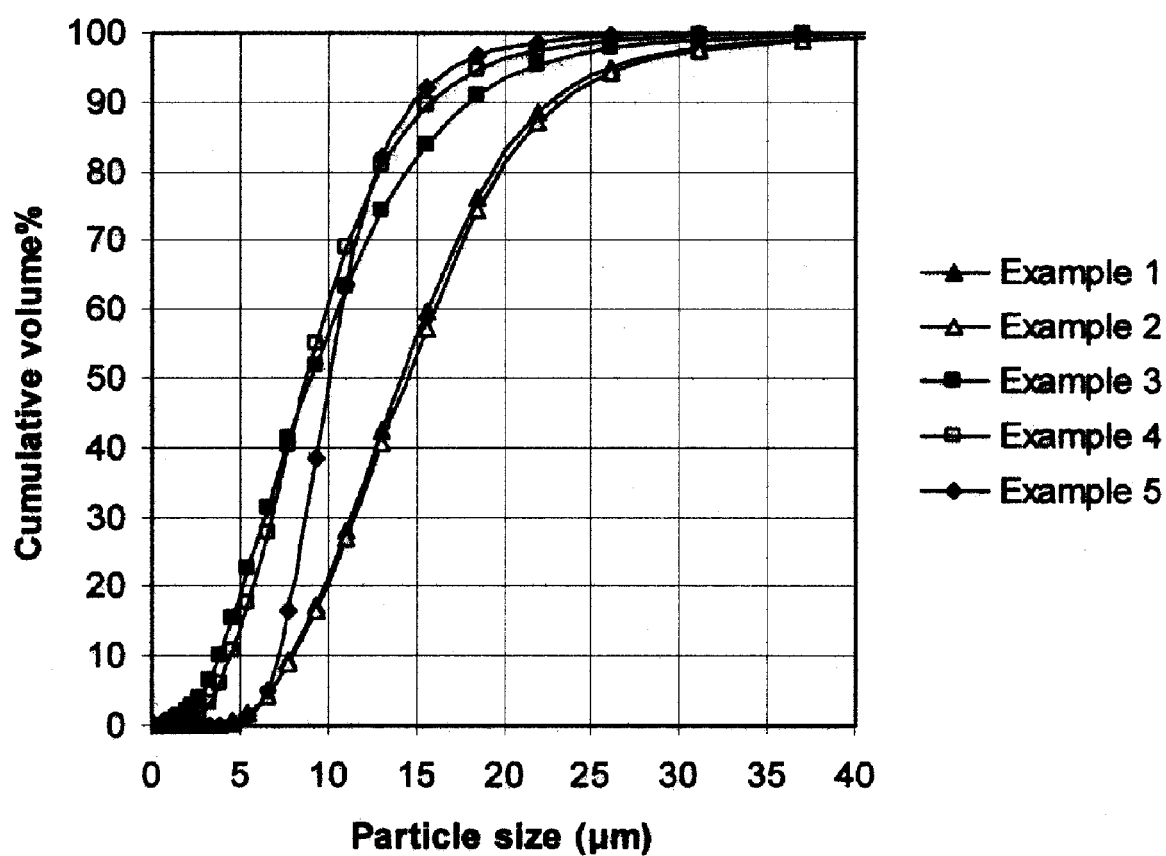
FIG. 2 shows EL phosphor particle size distributions for Examples 1-5. The y-axis represents cumulative volume fraction (%) of the material with particle sizes under a given value which is indicated by the x-axis.

The present invention is an electroluminescent phosphor powder that includes copper-activated zinc sulfide particles that have a size distribution with a D50 value of no more than 10 μm, where no more than 25% of the particles have a size greater than about 15 μm and/or a 24-hr brightness of at least 15 footlamberts (fL). The D50 value is seen in FIG. 2 as the point where a curve passes through the 50% cumulative volume line.

Preferably, no more than 15% of the particles in the powder have a size greater than about 15 μm, and more preferably no more than 10% of the particles have a size greater than about 15 μm. The size distribution of the powder shows that more than 60% of the particles have a size in the range of about 5 μm to about 15 μm. Preferably more than 75% and, even more preferably, more than 90% of the particles have a size in the range of about 5 μm to about 15 μm.

These particles are made by the below-described method that includes first firing copper-doped zinc sulfide mixed with zinc oxide, sulfur and a chloride-containing flux, rapidly cooling the mixture to below 100° C., and then mulling and second firing the mixture to provide a powder. The powder can then be elutriated to provide the electroluminescent powder with the narrow particle size distribution (more than 90% between about 5 μm and about 15 μm). In a further embodiment, the elutriating step can be avoided (albeit with a slightly wider size distribution) by more tightly controlling the first firing temperature.

1. Pretreatment.

Two types of ZnS powder can be used. One has 1 weight percent (wt. %) chlorine and one has no chlorine. Such ZnS powders can be used directly for compounding. The ZnS powder is preferably pretreated with a copper compound in aqueous solution (wet-doping). In a suitable container filled with about one gallon cold de-ionized (DI) water, with agitation add an appropriate amount of copper sulfate (anhydrous $CuSO_4$ or hydrated $CuSO_4.5H_2O$) based on the emitting color requirement; then add one kilogram (kg) of ZnS powder. Keep agitating for about 20 minutes and then settle, decant, and filter. Dry the powder in oven at 140° C. for at least 20 hours. The treated ZnS has a CuS layer coated on its surface and is ready for compounding.

2. The Elutriation Embodiment.

In this embodiment, a material with a D50 particle size between 12 and 17 μm is first prepared and then the material is elutriated with water to obtain finer particle sizes whose size distribution has a D50 value of no more than 10 μm. The fine size materials made with this method exhibit good particle morphology and a narrow particle size distribution.

a. Synthesis.

The phosphors with a particle size between 12 and 17 μm is prepared in two firing steps. In the first firing step, the wet-Cu-doped zinc sulfide is blended with appropriate amounts of zinc oxide (ZnO), sulfur, and a chloride-containing flux. The chloride-containing flux may be a mixture of alkali metal and alkaline earth chlorides, preferably magnesium chloride ($MgCl_2$) and one or both of sodium chloride (NaCl) and barium chloride ($BaCl_2$). The blended mixture preferably contains in weight percent (wt. %) relative to the weight of ZnS: 0.03 to 0.11 wt. % Cu, 0.1 to 0.8 wt. % ZnO, 1 to 8 wt. % sulfur, and 0.5 to 8 wt. % chloride flux.

The blended mixture is fired in air at a temperature from about 1050° C. to about 11150° C. for about 25 to about 90 minutes. A fast cooling after the first firing is preferred. The fast cooling is achieved by placing the red hot crucibles in front of fans or blowing compressed air to the bottom of the crucibles. Typically, the crucibles were cooled from the reaction temperature to below 100° C. in less than about 60 minutes. The fired material is then water washed, dried, and gently mulled (low-intensity milling) to induce defects in its crystal structure. The mulling time depends on the particular type of equipment used and the amount of material being mulled. An optimum mulling time can be readily determined by one skilled in the art of EL phosphors. In our case, a typical mulling time ranged from 75 to 150 minutes for 450 to 550 g of material.

After mulling, the material is washed with hydrochloric acid (adjust slurry pH 0.3-0.9) and then a basic solution containing sodium hydroxide (NaOH), hydrogen peroxide ($H_2O_2$), and a chelating agent, such as diethylenetriaminepentaacetic acid (DTPA). In a preferred method, the basic solution contains relative to the phosphor weight: 2-4.5 wt. % DTPA, 2.5-4.0 wt. % NaOH, and 5-15 wt. % of a 35% $H_2O_2$ solution. This chemical wash further removes flux residues and copper sulfides from the phosphor surface. The material is then washed with hot deionized water and then dried to complete the first firing step.

In the second firing step, the material from the first firing step is blended with appropriate amounts of a copper source and zinc oxide. Preferably, the material from the first firing step is blended with 0.1-1 wt. % anhydrous copper sulfate ($CuSO_4$) and 5-15 wt. % zinc oxide (ZnO). The blended material is then fired in air at a temperature from about 700° C. to about 850° C. for about 1 to about 4 hours. The fired cake is preferably cooled in the furnace slowly to about 430° C. in 2 hours. Then the cake can be cooled naturally outside the furnace. The fired material is washed with hot deionized water, acid, and the basic solution of DTPA-NaOH—$H_2O_2$ used in the first firing step. After a final water washing to remove any remaining chemical residues, the material is dried and sifted through a 500 mesh or 635 mesh stainless screen to form an EL phosphor that is ready for elutriation.

b. Elutriation.

In an appropriately sized container, add the prepared EL phosphor powder and an appropriate amount of cold DI water. With agitation, add small amount of dispersant liquid (e.g., Darvan 821 A, manufactured by R.T. Vanderbilt Company, Inc.), agitate for 2-10 min, and settle for an amount of time depending on the particular lot made. Decant the top solution into a different container to collect fines. The leftover in the original container is repeatedly elutriated until enough fine particle size material is collected or until the original material exhibits very fast settling, indicative that most fine particles are separated. The collected fines can be further elutriated if necessary to obtain the desired particle size. The fine size material is dried in an oven to complete the preparation. It is normally not necessary to perform sifting after the oven drying.

3. The Direct Synthesis Embodiment.

In this embodiment, the EL phosphors are made without using the elutriation procedure. The general preparation procedure is very similar to the one described above except that the first step firing temperature and firing time are more tightly controlled in order to achieve a particle size less than 10 μm. The firing temperature is normally between 1050° C. and 1085° C. and firing time is between 25 and 55 minutes. The final product is screened through a 635 mesh stainless screen. This embodiment does not require as much time as the elutriation embodiment but produces materials with a slightly broader particle size distribution.

For orange-emitting EL phosphors, the preparation procedure is similar except that a manganese compound (for example, $MnCO_3$) is added in the second firing step which is performed at a higher temperature.

4. EXAMPLES

Several examples of small size EL phosphors are given below. Particle sizes were measured using a Microtrac X100 particle size analyzer (LEEDS and NORTHRUP Instruments). Particle size is expressed as D50, which is the particle size at which the cumulative volume fraction of particles reaches 50%. Examples 1 and 2 below are for D50 particle sizes between 10 and 15 μm. Examples 3-6 are for D50 particle sizes less than 10 μm. Example 5 includes elutriation, while examples 1-4 and 6 do not. FIG. 2 shows particle size distribution curves for Examples 1-5. The x-axis represents particle size in micrometers (μm) and the y-axis represents the cumulative volume fraction (%) of the material with particle sizes under a given value.

Phosphors were tested in conventional thick-film electroluminescent lamps operated at 100 V and 400 Hz in a 50% R.H, 70° F. environment. The test lamps are comprised of an ~40 μm-thick phosphor layer and an approximately 26 μm-thick barium titanate dielectric layer. The lamps are constructed by combining the phosphor with a cyanoresin binder (Shin Etsu Co.) which has been dissolved in a mixture of acetone and dimethylformamide. In particular, the binder is made by mixing 575 g of acetone, 575 g of dimethylformamide, and 400 g of cyanoresin. The percentage of phosphor in the liquid binder is 50 wt. % and the percentage of phosphor after the binder-phosphor mix is dried is 79.5 wt. %. The phosphor suspension is blade coated onto a 0.0065-0.0075 in.-thick PET film having a transparent, conductive layer of indium-tin oxide (ITO) (OC-200 available from CPFilms). After drying, the barium titanate layer is applied over the phosphor layer in the same way using a suspension of barium titanate dispersed in the cyanoresin binder. In particular, the binder barium-titanate mix is made by mixing 375 g of liquid cyanoresin binder, 375 g of barium titanate, and 82.5 g of dimethylformamide. The percentage of barium titanate in the binder after drying is 79.5 wt. %. A rear electrode comprised of a 40 to 60 µm thick graphite layer is applied to the dried barium titanate dielectric layer using a graphite suspension (423 SS from Acheson Colloids). Lead wires are attached and the entire lamp is laminated with clear, flexible film (Aclam TC200 from Honeywell Corp.) which is applied to both sides. The lamps were operated for 24 hours prior to measuring their brightness in order to stabilize the lamps and obtain representative measurements. Brightness as used herein means the brightness of the phosphor in a conventional thick-film electroluminescent lamp, which has been operated at 100 V and 400 Hz for 24 hours. Brightness values are given in footlamberts (fL).

EXAMPLE 1

In a 4 L container, add 1.8 L of cold DI water. With agitation, add 1.441 g of anhydrous $CuSO_4$ (which contained 5.4 wt. % of moisture) and 600 g of ZnS containing 1 wt. % chlorine. Agitate the slurry for about 20 minutes and then let it settle. In this case, 0.090% of Cu was added based on the weight of ZnS. Filter and oven dry the treated ZnS at 140° C. for 62.5 hours.

Take 550 g of the treated and dried ZnS and mix it with 0.72 g (0.13 wt. %) of zinc oxide (ZnO), 11.43 g (2.1 wt. %) of sulfur, and a chloride flux containing 9.62 g (1.75 wt. %) of magnesium chloride ($MgCl_2$), and 1.38 g (0.25 wt. %) of sodium chloride (NaCl). The mixture was then fired in air at 1085° C. for 70 minutes using 500 ml silica crucibles. The red hot crucible containing fired material was taken out from the furnace and cooled in air in front of two fans. The fired material was then washed with hot deionized (DI) water several times to remove most of the chloride flux and dried at 120° C. for 15 hours. The material was sifted through a 100 mesh screen and then mulled for 150 minutes. After that, the material was washed with a hydrochloric acid solution (pH 0.3-0.4) followed by several hot DI water washes (until pH >4) and a basic solution containing 4 wt. % DTPA, 2.8 wt. % NaOH, and 8.6 wt. % $H_2O_2$ (35% solution). The phosphor was then washed with hot DI water and dried at 120° C. for 15 hours to complete the first firing step.

In the second firing step, 100 g of material from the first firing step was blended with 0.50 g (0.50 wt. %) of anhydrous $CuSO_4$ and 10.00 g (10.0 wt. %) of ZnO and fired in air at 735° C. for 2 hours and 15 minutes. The material was cooled in the furnace to 455° C. in two hours (approximately 2.3 degree per minute cooling rate). After that, it was taken out of the furnace and cooled naturally to room temperature. The fired material was washed with hot deionized water, hydrochloric acid, and then twice with a basic solution of DTPA-NaOH-$H_2O_2$ (4.5 wt. % DTPA, 2.8 wt. % NaOH, and 12.9 wt. % $H_2O_2$ (35% solution)). After a final water washing, the material was dried and sifted through a 635 mesh stainless screen to form a small particle size EL phosphor. The yield of the final −635 mesh material was 65% relative to the amount of treated ZnS used in the first step compounding stage. The lost material was due to multi-step firing, washing, sifting (coarse over), and other process steps. Selected data are shown in Table 1.

TABLE 1

| Example 1 | |
|---|---|
| 24 h Brightness (fL) | 34.9 |
| X Color coordinate | 0.167 |
| Y Color coordinate | 0.434 |
| Particle size D50 (µm) | 14.1 |
| Volume fraction ≥ 22.0 µm | 11.6% or less |
| Volume fraction ≥ 26.16 µm | 5.09% or less |
| Volume fraction ≤ 7.78 µm | 9.28% or less |
| Volume fraction ≤ 4.63 µm | 0.57% or less |

EXAMPLE 2

This material was made in a manner similar to EXAMPLE 1 except that the ZnS raw material did not contain chlorine. The yield of final −635 mesh material was over 70% relative to the amount of treated ZnS used in the first step compounding stage. Use of non-Cl ZnS as starting material produced slightly higher yield of final product. Data are shown in Table 2.

TABLE 2

| Example 2 | |
|---|---|
| 24 h Brightness (fL) | 34.6 |
| X Color coordinate | 0.167 |
| Y Color coordinate | 0.432 |
| Particle size D50 (µm) | 14.5 |
| Volume fraction ≥ 22.0 µm | 12.5% or less |
| Volume fraction ≥ 26.16 µm | 5.83% or less |
| Volume fraction ≤ 7.78 µm | 8.93% or less |
| Volume fraction ≤ 4.63 µm | 0.53% or less |

EXAMPLE 3

This material was made in a manner similar to EXAMPLE 2 except, (1) the non-Cl ZnS was treated with 0.11 wt. % of Cu (instead of 0.090 wt. %), (2) the chloride flux composition used for the first firing step consisted of 0.125 wt. % of NaCl (instead of 0.25 wt. %) and 0.875 wt. % of $MgCl_2$ (instead of 1.75 wt. %) and 0.065 wt. % of ZnO (instead of 0.13 wt. %) was used for the compounding, and (3) the mixture was fired in air at 1050° C. for 34 minutes using a 250 ml alumina crucible.

The yield of final −635 mesh material was about 73.6% relative to the amount of treated ZnS used in the first step compounding stage. Selected data for this sample are shown in Table 3.

TABLE 3

| Example 3 | |
|---|---|
| 24 h Brightness (fL) | 17.0 |
| X Color coordinate | 0.180 |
| Y Color Coordinate | 0.457 |

TABLE 3-continued

| Example 3 | |
|---|---|
| Particle size D50 (μm) | 8.97 |
| Volume fraction ≧ 15.56 μm | 16.0% or less |
| Volume fraction ≧ 22.00 μm | 4.50% or less |
| Volume fraction ≦ 4.63 μm | 15.5% or less |
| Volume fraction ≦ 1.95 μm | 2.1% or less |

EXAMPLE 4

This material was made in a manner similar to EXAMPLE 3 except that 100 ml alumina crucibles were used for the first step firing. The yield of final −635 mesh material was about 77.8% relative to the amount of treated ZnS used in the first step compounding stage.

Selected data for this sample are shown in Table 4. It can be seen that the smaller crucible produced slightly brighter materials with a narrower particle size distribution.

TABLE 4

| Example 4 | |
|---|---|
| 24 h Brightness (fL) | 17.8 |
| X Color coordinate | 0.181 |
| Y Color coordinate | 0.439 |
| Particle size D50 (μm) | 8.95 |
| Volume fraction ≧ 15.56 μm | 10.58% or less |
| Volume fraction ≧ 22.00 μm | 2.49% or less |
| Volume fraction ≦ 4.63 μm | 10.81% or less |
| Volume fraction ≦ 1.95 μm | 0.32% or less |

EXAMPLE 5

The material was made in a manner similar to EXAMPLE 1 except, (1) in the ZnS pretreatment stage, 0.087 wt. % of Cu instead of 0.090 wt. % was used and the treated ZnS was oven dried at 130° C. for 20 hours, (2) the chloride flux composition used for the first firing step consisted of 1.05 wt. % of NaCl (instead of 0.25 wt. %), 2.35 wt. % of $MgCl_2$ (instead of 1.75 wt. %), and 0.65 wt. % of anhydrous $BaCl_2$ (instead of 0%), and 0.26 wt. % of ZnO (instead of 0.13 wt. %) was used for the compounding, (3) the mixture was fired in air at 1085° C. for 75 minutes using a 500 ml silica crucible, (4) the second step firing was done at 770° C. for 2 hours and 15 minutes and the material was cooled in furnace to 566° C. approximately at a cooling rate of 1.7 degree per minute, (5) the material was sifted through 325 mesh (instead of 635 mesh) stainless screen after the second step firing, washing, and drying, and (6) the material obtained was then elutriated in an aqueous solution to removed coarse portion of the materials. The elutriation procedure is described below.

In a two-liter glass beaker, add 300 g of EL phosphor made as described above and 1400 ml of cold DI water. With agitation, add 1.00 g of dispersant liquid (e.g., Darvan 812A, manufactured by R.T.Vanderbilt Company, Inc.), agitate slurry for about 5 minutes and then settle for 4 minutes. Decant top slurry to a second container to collect fines. Refill the original container with cold DI water to 1500 ml level. Add 1.00 g of the dispersant and repeat the elutriation procedure (agitate, settle, and decant). Combine the two fines together. This fine portion is called Fine-1 with a yield of about 115 g and the coarse portion obtained at this point is called Coarse-1 with a yield of about 182 g. More fines can be obtained from the coarse portion if necessary by modifying the elutriation condition.

Take 90 g of Fine-1 obtained and place it in a one-liter glass beaker and add 700 g of cold DI water. Repeat the elutriation procedure (agitate 5 minutes, settle 4 minutes, and then decant to collect) described above, twice. Filter the solution, rinse phosphor with hot DI water in funnel, and finally dry in oven at 120° C. for 15 hours. The fine portion obtained in this second elutriation step is called Fine-2 with a yield about 38 g and the coarse portion is called Coarse-2 with a yield about 48 g.

Selected data for the Fine-2 portion are shown in Table 5. As may be seen in FIG. 2, example 5, made by elutriation method, exhibited a narrower particle size distribution (the curve is more vertical), which is important for achieving a good coating on the particles in a fluidized bed reactor. The disadvantage of this method is that the whole process is longer because of the elutriation steps.

TABLE 5

| Example 5 | |
|---|---|
| 24 h Brightness (fL) | 15.6 |
| X Color coordinate | 0.177 |
| Y Color coordinate | 0.429 |
| Particle size D50 (μm) | 9.99 |
| Volume fraction ≧ 15.56 μm | 7.98% or less |
| Volume fraction ≧ 22.00 μm | 1.37% or less |
| Volume fraction ≦ 4.63 μm | 0.34% or less |
| Volume fraction ≦ 1.95 μm | ND |

EXAMPLE 6

This material was made similarly to Example 3 except that 6.32 wt. % of $MnCO_3$ was added for the second step firing and the firing was conducted at 860° C. for 2 hours and 30 minutes. For the chemical washing part, a second hydrochloric acid washing was added after the first hydrochloric acid washing and before the basic washing using DTPA-NaOH—$H_2O_2$ solution. Selected data for this sample are shown in Table 6.

TABLE 6

| Example 6 | |
|---|---|
| 24 h Brightness (fL) | 3.4 |
| X Color coordinate | 0.545 |
| Y Color coordinate | 0.448 |
| Particle size D50 (μm) | 9.60 |
| Volume fraction ≧ 15.56 μm | 18.20% or less |
| Volume fraction ≧ 22.00 μm | 5.08% or less |
| Volume fraction ≦ 4.63 μm | 10.90% or less |
| Volume fraction ≦ 1.95 μm | 1.71% |

While embodiments of the present invention have been described in the foregoing specification and drawings, it is to be understood that the present invention is defined by the following claims when read in light of the specification and drawings.

What is claimed is:

1. An electroluminescent phosphor powder comprising copper-activated zinc sulfide particles that have a size distribution with a D50 value of no more than 10 μm and where the particles have a 24-hr brightness of at least 15 footlamberts.

2. The powder of claim 1, wherein more than 60% of the particles have a size in the range of about 5 μm to about 15 μm.

3. The powder of claim 2, wherein more than 75% of the particles have a size in the range of about 5 μm to about 15 μm.

4. The powder of claim 3, wherein more than 90% of the particles have a size in the range of about 5 μm to about 15 μm.

5. A method of making an electroluminescent phosphor powder comprising the steps of:
  combining copper-doped zinc sulfide with zinc oxide, sulfur and a chloride-containing flux to form a mixture;
  first firing the mixture at a temperature in a range of 1050-1150° C. for 25-90 minutes;
  first cooling the fired mixture to below 100° C. in less than about 60 minutes;
  mulling the cooled mixture to form a mulled mixture;
  blending the mulled mixture with zinc oxide and a copper source;
  second firing the mulled mixture at a temperature in a range of 700-850° C. for 1-4 hours;
  second cooling the fired mulled mixture to provide an electroluminescent powder comprising copper-activated zinc sulfide particles that have a D50 value of 12-17 μm; and
  elutriating the cooled mulled mixture to provide an electroluminescent powder comprising copper-activated zinc sulfide particles that have a size distribution with a D50 value of no more than 10 μm.

6. The method of claim 5, wherein the copper-doped zinc sulfide includes chlorine before being combined to form the mixture.

7. The method of claim 5, wherein between the mulling step and the second firing step, the mulled mixture is washed with an hydrochloric acid followed by a wash with a basic DTPA-NaOH-$H_2O_2$ solution to remove flux residue and copper sulfides from the particle surface.

8. A method of making an electroluminescent phosphor powder comprising the steps of:
  combining copper-doped zinc sulfide with zinc oxide, sulfur and a chloride-containing flux to form a mixture;
  first firing the mixture at a first temperature in a range of 1050-1085° C. for 25-55 minutes;
  first cooling the fired mixture to below 100° C. in less than about 60 minutes;
  mulling the cooled mixture to form a mulled mixture;
  blending the mulled mixture with zinc oxide and a copper source;
  second firing the mulled mixture at a second temperature in a range of 700-850° C. for 1-4 hours;
  second cooling the fired mulled mixture; and
  screening the cooled mulled mixture to provide an electroluminescent powder comprising copper-activated zinc sulfide particles that have a size distribution with a D50 value of no more than 10 μm.

9. The method of claim 8, wherein between the mulling step and the second firing step, the mulled mixture is washed with hydrochloric acid followed by a wash with a basic DTPA-NaOH-$H_2O_2$ solution to remove flux residue and copper sulfides from the particle surface.

10. An electroluminescent lamp, comprising a first electrode, a second electrode, a first dielectric layer containing a dielectric material, and a second dielectric layer containing an electroluminescent phosphor, the dielectric layers being located between the first and second electrodes and the phosphor comprising copper-activated zinc sulfide particles that have a size distribution with a D50 value of no more than 10 μm and a 24-hr brightness of at least 15 footlamberts.

* * * * *